April 23, 1968   J. W. SHARP ETAL   3,379,009
COMBUSTION SYSTEM FOR FLUID FUEL
Original Filed June 4, 1965   3 Sheets-Sheet 2
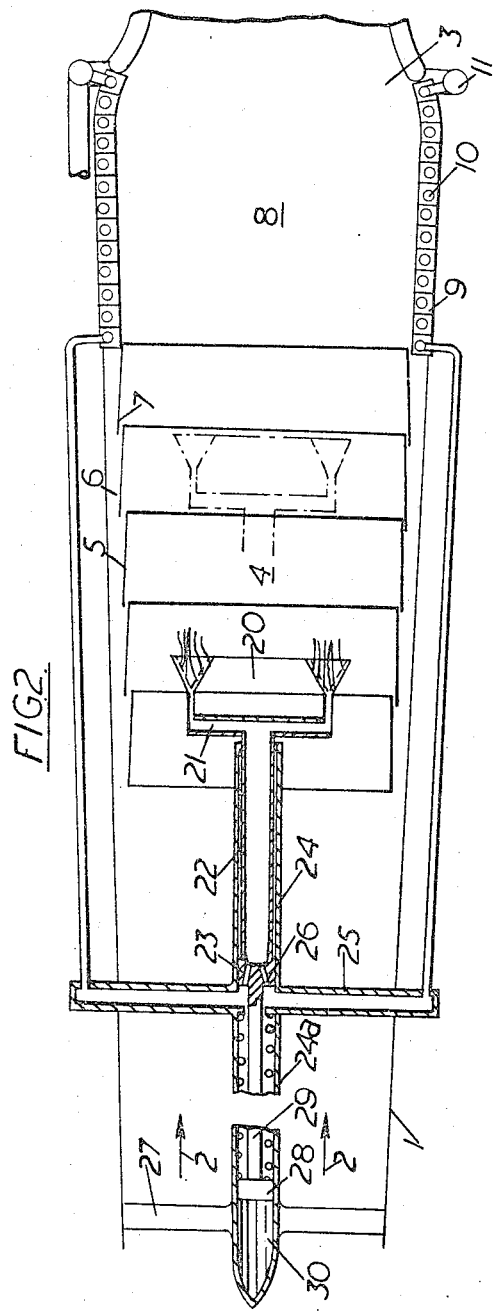
Inventors
JAMES WALLER SHARP
PHILIP ERIC HARDY
By
Bailey, Stephens & Huettig
Attorneys

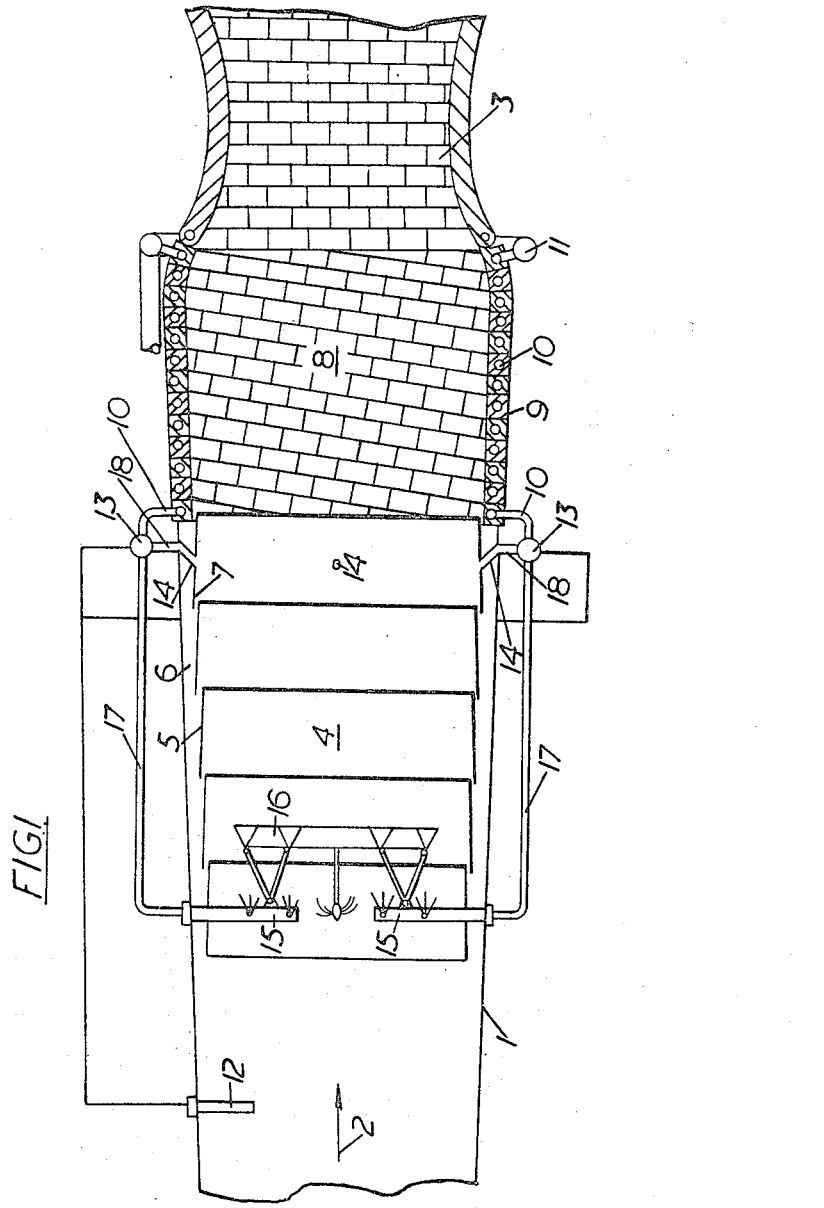

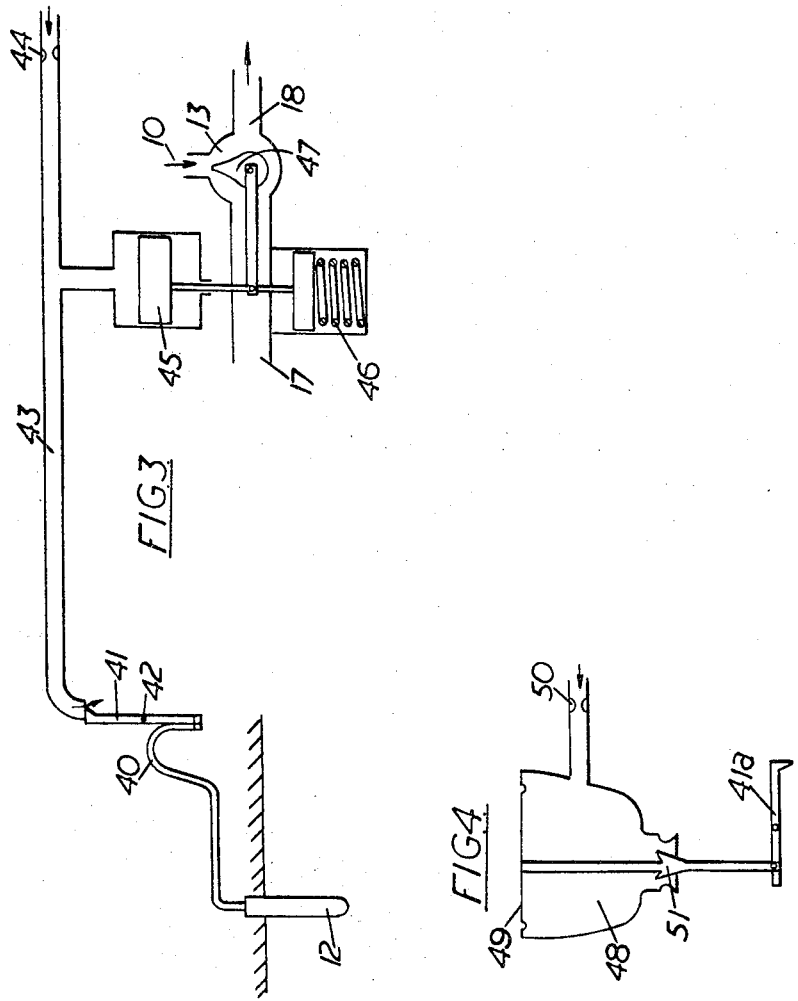

United States Patent Office 3,379,009
Patented Apr. 23, 1968

3,379,009
COMBUSTION SYSTEM FOR FLUID FUEL
James Walter Sharp, Bristol, and Philip Eric Hardy, Nuneaton, England, assignors to Bristol Siddeley Engines Limited, Bristol, England, a British company
Continuation of application Ser. No. 461,323, June 4, 1965. This application June 27, 1967, Ser. No. 649,353
Claims priority, application Great Britain, June 6, 1964, 18,870/64
4 Claims. (Cl. 60—243)

ABSTRACT OF THE DISCLOSURE

Apparatus for injecting fuel into an air breather type combustion chamber at different locations along the length thereof, the specific location being selected in response to temperature changes of pre-combustion gas.

This application is a continuation of application S.N. 461,323, filed June 4, 1965, and now abandoned.

In the fluid-fuelled air-breathing jet propulsion engines for aircraft operative through a multi-sonic range, difficulties in the construction of the combustion chamber are encountered owing to the very high combustion temperatures which are reached at flight Mach numbers exceeding about three, the high combustion temperatures being due to the high precombustion temperatures of the air, the values of which depend upon whether compression is purely by ram effect or is assisted by a mechanical compressor.

Secondary effects of the increasing pre-combustion temperatures are that the combustion process becomes more rapid, so that it can be completed in a shorter length of duct, and that at pre-combustion temperatures over about 600° C. (the exact value depending upon the fuel used and the way it is injected into the duct), it is readily possible to effect stable combustion without the use of flame-holding baffle systems. Also of course the air becomes relatively ineffective as a coolant for the combustion apparatus.

The object of the invention is to provide combustion apparatus, and methods of operating them, in which, by taking advantage of the above-mentioned secondary effects, the extent of the parts subjected to very high temperatures, and therefore necessarily of special heat-resisting construction, is substantially reduced. While the invention is of interest mainly in connection with engines of the kind described, it may be useful in other cases in which combustion has to be effected in a combustion-supporting gas the pre-combustion temperature of which varies between cool and very hot.

Combustion apparatus according to the invention comprises a duct for a flow of combustion-supporting gas, and means for dispersing fluid fuel into the duct at alternative positions along the duct, which are selected in response to changes in pre-combustion temperature of the gas.

By these means it is possible for the length of duct wall which will be exposed to the highest temperature gases, and will require special heat protection, to be less than would otherwise be the case. The most upstream of the alternative positions must be sufficiently far from the outlet to permit combustion to be completed in the duct in the least favourable conditions experienced at the lowest required pre-combustion temperature.

The arrangement and method of operation may be such that at each pre-combustion temperature fuel is dispersed into the duct at one position along the duct only, the position depending upon the pre-combustion temperature. Alternatively, fuel dispersion may be effected into the duct at several positions along the duct simultaneously, the selection of the positions being dependent upon the pre-combustion temperature.

The fuel dispersing means may consist of a single injector system which is moved along the duct progressively or in steps in dependence upon pre-combustion temperature, or it may consist of a series of injectors spaced along the duct and arranged to be brought into action as required.

To maintain stable combustion when fuel dispersion is operative at the most upstream position, it will usually be necessary to provide a flame-holding baffle system in or closely downstream of this position. The baffle system may be arranged for movement downstream to a new operative position when the fuel dispersion with which it is operating is stopped, or the change-over to a downstream dispersion position may be delayed until the pre-combustion temperature has risen sufficiently to make it possible to operate with fuel dispersion at the downstream position without a flame-holding baffle system.

Two examples of combustion apparatus according to the invention, used in jet propulsion engines for aircraft, are illustrated in the accompanying drawings, in which:

FIGURE 1 is a diagrammatic longitudinal section of one apparatus;

FIGURE 2 is a similar view of a second apparatus;

FIGURE 3 is a diagram of a control (used with the apparatus shown in FIGURE 1); and FIGURE 4 is a diagram of part of an alternative control.

The example shown in FIGURE 1 comprises a duct 1 which receives air flowing in the direction of arrows 2 from a ram air intake, not shown. Up to a flight speed of said Mach 3 the flow may be assisted by a turbine driven fan or compressor. The duct has an outlet constituted by an adjustable jet propulsion nozzle 3 the walls of which are constructed of refractory materials and possibly provided with channels for a fluid coolant. Part of the duct upstream of the nozzle constitutes a combustion chamber, the length of this part being sufficient to permit combustion to be completed upstream of the nozzle in the least favourable conditions experienced at the lowest pre-combustion air temperature, which is about 10° C.

Combustion takes place in a first part 4 of this chamber when the pre-combustion temperature of the air is below 600° C., that it is to say at flight speeds up to about Mach 4, and it is sufficient for the walls of this part of the chamber to be arranged for film cooling by part of the air, in a manner which is now in common use. For this purpose the wall is provided with a series of liners 5 which are spaced from the wall of the duct to form a cooling air passage 6, and which overlaps to leave gaps 7 directed downstream through which the cooling air emerges to form protective films over the liners.

Combustion takes place in the second part 8 of the combustion chamber at all times when fuel is being supplied, and at the upper end of the working range the combustion temperatures may rise to around 2000° C. The walls of this part of the chamber are therefore constructed from refractory ceramic elements 9 mounted on pipes 10 through which liquid fuel is passed from a supply manifold 11. The length of duct provided with walls of this special heat resisting construction is sufficient to enable combustion to be completed in it when the pre-combustion air temperature is about 600° C. When this condition exists, a system of 3-way valves 13 directs fuel from the pipes 10 into nozzles 14 which discharge it into the duct, preferably in an obliquely upstream direction, at a position slightly upstream of the part 8 of the chamber. The jets of fuel, possibly in vaporised condition, create sufficient turbulence for stable combustion to take place in the part 8 of the chamber without the assistance of any flame-holding baffles.

The nozzles 14 would not enable stable combustion to be maintained and completed in the duct with pre-combustion air temperatures below about 600° C. They are therefore supplemented by a conventional dispersion and flame-holding system arranged at the upstream end of the first part 4 of the combustion chamber. The supplemental system shown comprises fuel injectors 15 arranged upstream of a system of circular and radial flame-holding gutters 16. Fuel is supplied to the injectors 15 from the 3-way valves 13 through pipes 17 when the pre-combustion air temperature is below about 600° C. At this time the fuel supply to the nozzles 14 is shut off, or at least substantially reduced.

The valves 13 are controlled by a thermometric device 12 in the duct upstream of the combustion chamber. The control is shown in more detail in FIGURE 3. The device 12 is a tube containing mercury. This is connected to a Bourdon tube 40 which actuates a pilot valve member 41, pivoted at 42, so as to obstruct to varying extent the outlet end of a pipe 43. Ram air is supplied to the inlet of the pipe through a fixed restriction 44. Thus the pressure P within the pipe depends on the temperature of the device 12 and on the free stream total pressure of the ram air. This pressure P is applied to a piston 45, which acts against a spring 46, and the movements of which serve to turn a vane 47 within the valve 13, and thus directs fuel via the pipe 17 to the injectors 15 or via a pipe 18 to the injectors 14.

There may be an intermediate stage, during which fuel is supplied to both injectors.

An alternative arrangement is shown in FIGURE 4, where the pilot valve member 41a is actuated by a Machmeter in place of a thermometric device. The Machmeter consists of a chamber 48 defined in part by a diaphragm 49, the outer face of which is exposed to the free stream total pressure. Air at intake pressure from the engine is supplied to the chamber through a fixed restriction 50, and can leave through a variable restriction controlled by a needle 51 connected to the diaphragm. The diaphragm is also connected to the pilot valve member 41a.

In the example shown in FIGURE 2 the same construction is used for the duct walls as in FIGURE 1, but a single fuel dispersion system is used which is movable along the duct. This system comprises a circular flame-holding gutter 20 of double-walled construction, the inner wall being perforated for passage of fuel supplied through radial arms 21 from a tube 22 extending lengthwise of the duct and carrying a piston 23 operating in a cylinder 24. The cylinder 24 is supported in the duct by hollow radial arms 25 through which fuel is supplied from the coolant tubes 10 of the wall of the part 8 of the combustion chamber, the fuel passing through holes 26 in the piston 23. The cylinder 24 also has a forward extension 24a, supported by radial arms 27, in which operates a piston 28 connected by a rod 29 to the piston 23. Forward of the piston 28 the cylinder 24a contains a substance 30 which, at the pre-combustion air temperature at which the fuel dispersing and flame-holding gutter 20 is required to be moved rearwards to the position shown in chain-dot lines, attains sufficient vapour pressure to overcome a spring 31. This spring returns the system forwards when the temperature falls below the pre-determined temperature.

Alternatively the piston 28 may be slightly larger than the piston 23 so that the system is biassed to the forward position by fuel pressure.

Other ways of moving the fuel dispersing gutter 20, for example by means of a servo fluid, e.g. fuel, controlled by a thermometric device or by a Machmeter, will be obvious to those skilled in the art.

We claim:
1. A jet propulsion engine having combustion apparatus, which apparatus comprises a duct for a flow of combustion supporting gas, which duct has an upstream portion and an adjacent downstream portion, which downstream portion is constructed to withstand substantially higher combustion temperatures than the upstream portion, means for dispersing fluid fuel into the duct, and means responsive to a variable which varies substantially in proportion to the precombustion temperature of the gas of vrarying the distance from the outlet of the duct at which at least some of the fuel is dispersed in such a manner that combustion at higher combustion temperatures occurs only in the downstream portion of the duct.

2. An engine as claimed in claim 1, in which the dispersing means includes means to disperse fuel into the duct at axially spaced points thereof, the means responsive to the precombustion temperature being operative to disperse fuel only at the most downstream point when the precombustion temperature exceeds a predetermined value.

3. An engine as claimed in claim 1, in which the dispersing means comprises a single injector system within the duct mounted for movement longitudinally thereof, and said means responsive to precombustion temperature includes means connected to the injector system for moving it longitudinally of the duct.

4. A fluid-fuelled air-breathing jet propulsion engine comprising a first fuel injector, a propulsion nozzle, a high-temperature-resistant first duct portion extending between the first injector and the propulsion nozzle, which first duct portion is too short to permit upstream of the propulsion nozzle outlet the completion of the combustion of fuel injected from the first injector when the precombustion temperature of the air entering the engine is below a predetermined temperature, a second fuel injector, a second duct portion substantially less temperature-resistant than the first duct portion and extending upstream from the first fuel injector to the second fuel injector, which second duct portion extends sufficiently upstream of the first fuel injector to permit upstream of the propulsion nozzle outlet the completion of the combustion of fuel injected from the second fuel injector when the precombustion temperature of the air entering the engine is below the predetermined temperature, and means responsive to a variable which varies substantially in proportion to the precombustion temperature of air entering the second duct portion for directing fuel to the fuel injectors so as to ensure completion of the combustion of the fuel upstream of the nozzle outlet, while subjecting only the first duct portion to high temperature.

References Cited

UNITED STATES PATENTS

| 2,566,373 | 9/1951 | Redding | 158—36 X |
| 2,594,206 | 4/1952 | Payne | 158—28 |
| 2,780,915 | 2/1957 | Karen | 158—36 X |
| 2,867,977 | 1/1959 | Buck | 60—270 X |

JULIUS E. WEST, *Primary Examiner.*